United States Patent
Yoshida

(10) Patent No.: US 8,823,861 B2
(45) Date of Patent: Sep. 2, 2014

(54) IMAGING APPARATUS, IMAGE DISPLAY APPARATUS, IMAGING METHOD, METHOD OF DISPLAYING IMAGE AND METHOD OF CORRECTING POSITION OF FOCUSING-AREA FRAME

(75) Inventor: Akihiro Yoshida, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 377 days.

(21) Appl. No.: 13/202,490

(22) PCT Filed: Feb. 26, 2010

(86) PCT No.: PCT/JP2010/053697
§ 371 (c)(1),
(2), (4) Date: Aug. 19, 2011

(87) PCT Pub. No.: WO2010/098507
PCT Pub. Date: Sep. 2, 2010

(65) Prior Publication Data
US 2011/0298961 A1 Dec. 8, 2011

(30) Foreign Application Priority Data

Feb. 27, 2009 (JP) ................................ 2009-045647

(51) Int. Cl.
*H04N 5/232* (2006.01)
*H04N 5/222* (2006.01)
*H04N 5/228* (2006.01)
*G03B 13/36* (2006.01)
*H04N 5/77* (2006.01)
*H04N 9/79* (2006.01)
*H04N 9/82* (2006.01)
*H04N 5/907* (2006.01)
*H04N 9/804* (2006.01)
*G02B 7/36* (2006.01)

(52) U.S. Cl.
CPC .......... *H04N 5/23212* (2013.01); *H04N 9/7921* (2013.01); *H04N 9/8205* (2013.01); *H04N 5/907* (2013.01); *H04N 9/8047* (2013.01); *H04N 9/8227* (2013.01); *G02B 7/36* (2013.01); *G03B 13/36* (2013.01); *H04N 5/772* (2013.01)
USPC .................. 348/345; 348/333.02; 348/208.12

(58) Field of Classification Search
CPC ....................... H04N 5/23293; H04N 5/23212
USPC ........................ 348/169, 345, 208.12, 333.02
See application file for complete search history.

(56) References Cited

U.S. PATENT DOCUMENTS

| 5,107,293 A | 4/1992 | Sekine et al. |
| 5,187,585 A * | 2/1993 | Kaneda et al. ................ 348/347 |

(Continued)

FOREIGN PATENT DOCUMENTS

| CN | 1731269 A | 2/2006 |
| EP | 0 358 196 A1 | 3/1990 |

(Continued)

*Primary Examiner* — Nhan T Tran
(74) *Attorney, Agent, or Firm* — Dickstein Shapiro LLP

(57) ABSTRACT

An imaging apparatus includes an optical unit capable of changing a focusing position and converting an image of a subject into an electric signal, an image processing device configured to convert the electric signal from the optical unit into imaging data and acquire reference image data before a shooting is taken, a display device configured to display the imaging data, a control device configured to control the image processing device, and a movement-detecting device connected to the image processing device and the control device and configured to detect movement information representing a variation between the imaging data and the reference image data, about each of the imaging data. The image processing device includes a correcting part configured to correct a focusing-area frame representing a focusing position of the imaging data, based on the detected movement information. The control device is configured to control the image processing device to display the corrected focusing-area frame and the imaging data together on the display device when the imaging data are reproduced.

15 Claims, 8 Drawing Sheets

(56) References Cited

U.S. PATENT DOCUMENTS

| | | |
|---|---|---|
| 5,561,498 A | 10/1996 | Sekine et al. |
| 6,982,750 B1 | 1/2006 | Yoshida et al. |
| 7,180,543 B2 | 2/2007 | Ojima et al. |
| 7,187,409 B2 | 3/2007 | Nakahira et al. |
| 7,307,662 B2 | 12/2007 | Yoshida et al. |
| 7,813,633 B2 | 10/2010 | Yoshida et al. |
| 8,035,721 B2 | 10/2011 | Honjo et al. |
| 2004/0169766 A1 | 9/2004 | Yoshida |
| 2005/0057678 A1* | 3/2005 | Fujii ................... 348/333.11 |
| 2005/0264679 A1 | 12/2005 | Sasaki et al. |
| 2006/0061677 A1 | 3/2006 | Yoshida |
| 2006/0066744 A1* | 3/2006 | Stavely et al. ............ 348/352 |
| 2007/0030369 A1 | 2/2007 | Ojima et al. |
| 2007/0212055 A1 | 9/2007 | Yoshida |
| 2007/0248341 A1 | 10/2007 | Larner et al. |
| 2007/0263997 A1 | 11/2007 | Hirai et al. |
| 2008/0084487 A1 | 4/2008 | Yoshida |
| 2008/0131109 A1 | 6/2008 | Honjo et al. |
| 2008/0166117 A1* | 7/2008 | Li et al. ...................... 396/121 |
| 2008/0259172 A1 | 10/2008 | Tamaru |
| 2009/0047010 A1 | 2/2009 | Yoshida et al. |
| 2009/0051786 A1 | 2/2009 | Katsumata |
| 2009/0091633 A1* | 4/2009 | Tamaru .................. 348/208.14 |
| 2009/0213239 A1 | 8/2009 | Yoshida |
| 2010/0177236 A1* | 7/2010 | Suzuki et al. ................ 348/349 |
| 2010/0226636 A1 | 9/2010 | Hirai et al. |
| 2010/0322611 A1 | 12/2010 | Yoshida et al. |

FOREIGN PATENT DOCUMENTS

| | | |
|---|---|---|
| EP | 1 601 189 A2 | 11/2005 |
| EP | 1 855 466 A2 | 11/2007 |
| EP | 2 007 135 A2 | 12/2008 |
| EP | 2 026 567 A1 | 2/2009 |
| EP | 2 166 408 A1 | 3/2010 |
| JP | 7-318785 A | 12/1995 |
| JP | 10-200840 A | 7/1998 |
| JP | 2002-135627 A | 5/2002 |
| JP | 2003-121731 A | 4/2003 |
| JP | 2006-254272 A | 9/2006 |
| JP | 2006-324861 A | 11/2006 |
| JP | 2007-267338 A | 10/2007 |
| JP | 2007-293337 A | 11/2007 |
| JP | 2008-67159 A | 3/2008 |
| JP | 2008-160427 A | 7/2008 |
| JP | 2009-27212 A | 2/2009 |
| JP | 2009-36832 A | 2/2009 |
| JP | 2010-97211 A | 4/2010 |

* cited by examiner

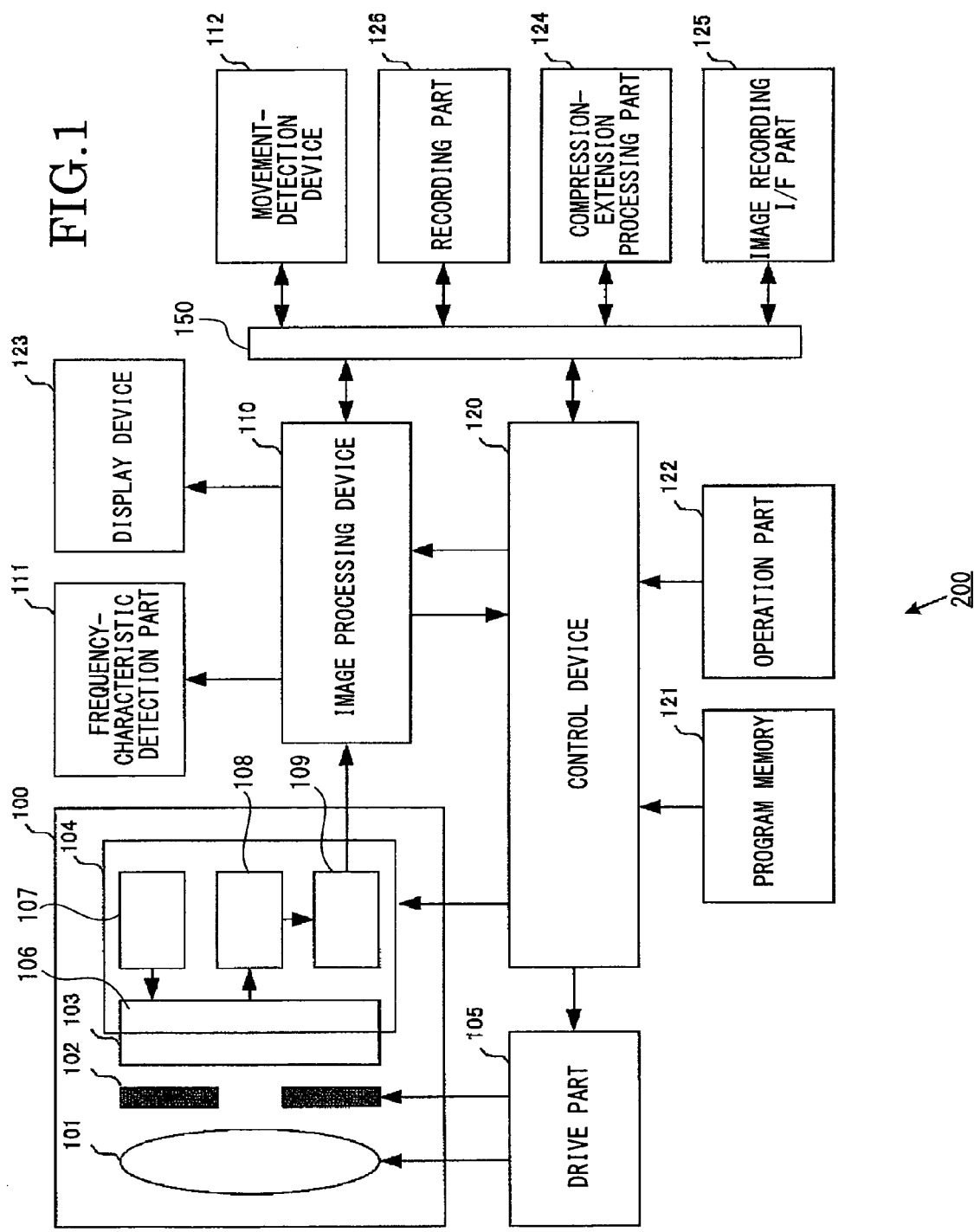

FIG. 2A
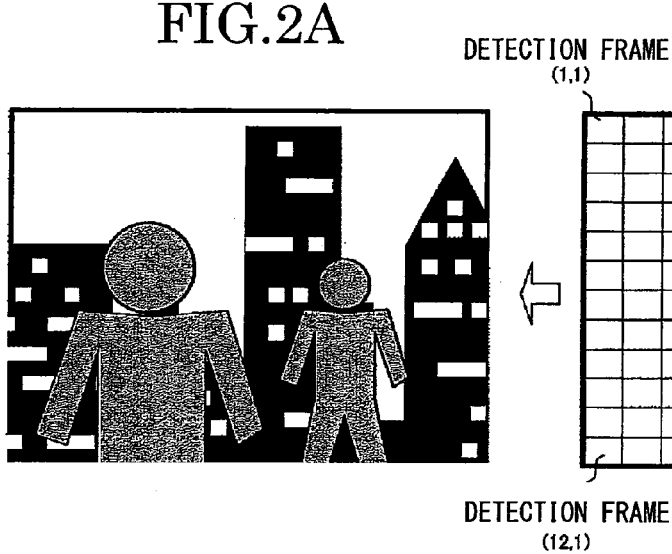
FIG. 2B
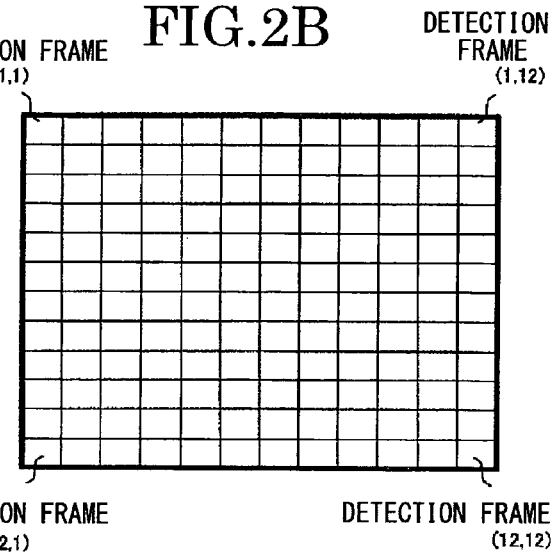
DETECTION FRAME (1,1)
DETECTION FRAME (1,12)
DETECTION FRAME (12,1)
DETECTION FRAME (12,12)
FIG. 2C
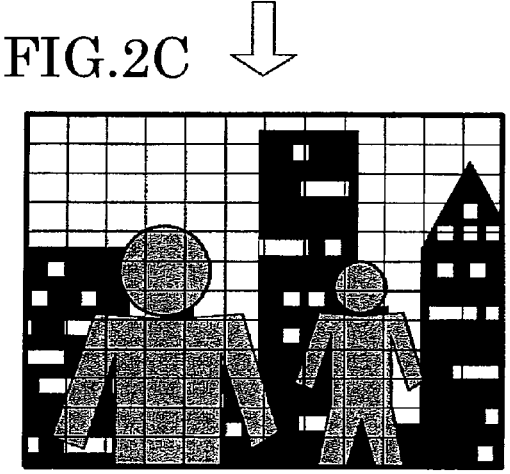
FIG. 2D
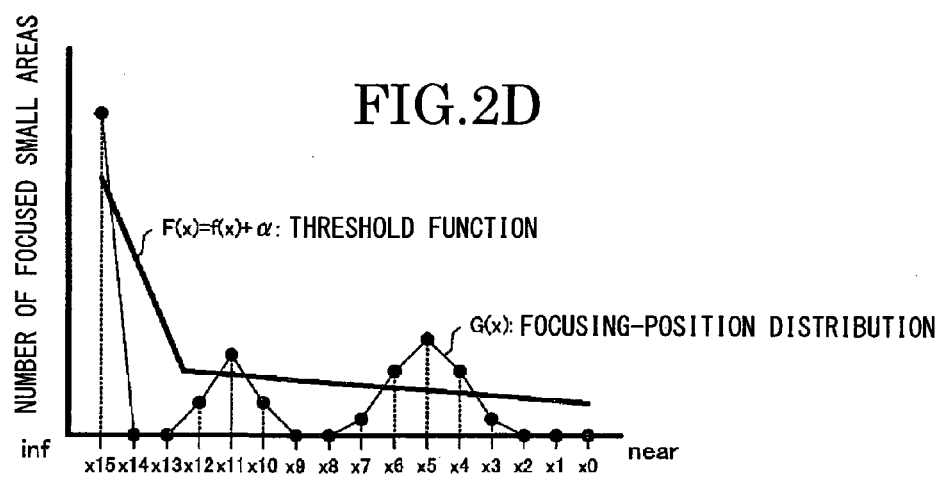
$F(x)=f(x)+\alpha$: THRESHOLD FUNCTION
$G(x)$: FOCUSING-POSITION DISTRIBUTION

300
FOCUSING-AREA FRAME

400
FOCUSING-AREA FRAME
(CORRECTED FOCUSING-AREA FRAME)

500
FOCUSING-AREA FRAME

600
FOCUSING-AREA FRAME
(CORRECTED FOCUSING-AREA FRAME)

IMAGING APPARATUS, IMAGE DISPLAY APPARATUS, IMAGING METHOD, METHOD OF DISPLAYING IMAGE AND METHOD OF CORRECTING POSITION OF FOCUSING-AREA FRAME

CROSS-REFERENCE TO THE RELATED APPLICATION

This application is based on and claims priority from Japanese Patent Application Number 2009-045647, filed on Feb. 27, 2009, the disclosure of which is hereby incorporated by reference herein in its entirety.

TECHNICAL FIELD

The present invention relates to an imaging apparatus such as a digital camera, more specifically, to an imaging apparatus, an imaging method, an image display apparatus, a method of displaying an image and a method of correcting a position of a focusing-area frame, which are configured to be capable of acquiring focused images which are required by a user, based on an amount of variation between each of all images shot continuously and a reference image, when the shot images are reproduced.

BACKGROUND ART

In imaging apparatuses, for example, digital cameras, when a deep subject is shot by an autofocus, there is possibility that a so-called focusing error (focusing misalignment) which focuses on a position where a photographer does not intend as a result of a limitation of performance of an algorithm or hardware. In such a case, a method of using a focus-bracket shooting as a countermeasure of deviation or variation in focusing is known (for reference, see Japanese Patent Application Publication No. 7-318785).

However, in the focus-bracket shooting, it is difficult to avoid a great focusing misalignment because it is usual to take shootings of about three times by moving slightly a focal position forwardly and backwardly. There may be a case that a photographer wants to select a best shot by viewing and comparing shot images after a plurality of shootings are taken by changing a focal position positively without deciding whether focusing on what subject fits, before shooting.

From these two backgrounds, it is considered that a convenient focus-bracket shooting capable of moving throughout a focusing range broader than that of the existing focus-bracket shooting and having focusing position-information of a subject is potentially demanded in a market. There is possibility that increasing immoderately the number of the focus-bracket shootings results in a cost up of instruments with increment in buffer memory capacities, or reduction in usability due to increment in times required for shooting and processing a record, if a compact type-digital camera has shooting numbers exceeding 40, in light of a recent background that the compact type-digital camera has recording pixels of ten million.

Therefore, to execute a focus-bracket shooting, the inventors of the present application have proposed an imaging apparatus configured to divide a picture plane into small sections, perform a hill-climbing scan by a detection frame unit of each small section, decide an entire focal position by comparing a distribution of focal positions in each small section and predetermined threshold values, and decide the number of shootings by the focus-bracket shooting, as disclosed in Japanese Patent Application No. 2008-238757.

However, in a hill-climbing scan used in the existing focus bracket shooting, there is generated a variation between a reproduced image and a display of focusing-area frames because data determining a focusing area and shot images are separate each other. When taking a shooting with a handheld camera, there is an influence that it is not possible to continue to hold the camera so that a field angle of the camera does not deviate during a time from the beginning of the hill-climbing scan to the end of shooting. If a focal distance of a shooting is close to a telescopic end, the influence cannot be ignored, and there is a problem of generating a great variation between a shot image and a reproduced image.

DISCLOSURE OF INVENTION

An object of the present invention is to provide an imaging apparatus, an imaging method, an apparatus of displaying an image and a method of correcting a position of a focusing-area frame, in which before shooting, a reference image is acquired, a movement between the reference image ant each of shot images by a focus-bracket shooting is detected, a variation in a field angle is corrected by moving a coordinate of a focusing-area frame representing a focal position of the shot images based on the detected results, and the corrected focusing-area frame in which the field angle variation is corrected is displayed when the shot images are reproduced, and thereby, it is possible to accomplish ease of treatment in a case of selecting images obtained, for example, in a focus-bracket shooting according to the requirement of a user.

To accomplish the above object, an imaging apparatus according to one embodiment of the present invention includes an optical unit capable of changing a focusing position and converting an image of a subject into an electric signal, an image processing device configured to convert the electric signal from the optical unit into imaging data and acquire a reference image before a shooting is taken, a display device configured to display the imaging data, a control device configured to control the image processing device, and a movement detecting device connected to the image processing device and the control device and configured to output movement information representing a variation between the imaging data and the reference image every each of the imaging data.

The image processing device includes a correcting part configured to correct a focusing-area frame showing a focusing portion of the imaging data.

The control device is configured to control the image processing device to display the corrected focusing-area frame on the display device when the imaging data are reproduced.

BRIEF DESCRIPTION OF DRAWINGS

FIG. 1 is a block view showing a schematic structure of an imaging apparatus according to one embodiment of the present invention.

FIG. 2 is an explanatory view acquiring a position of a focus bracket photography, in which FIG. 2A illustrates subjects, FIG. 2B illustrates detection frames, FIG. 2C illustrates a state in which the subjects and the detection frames are overlapped, and FIG. 2D illustrates a distribution of focusing positions in each of the detection frames.

DESCRIPTION OF EMBODIMENTS

Figure 3:
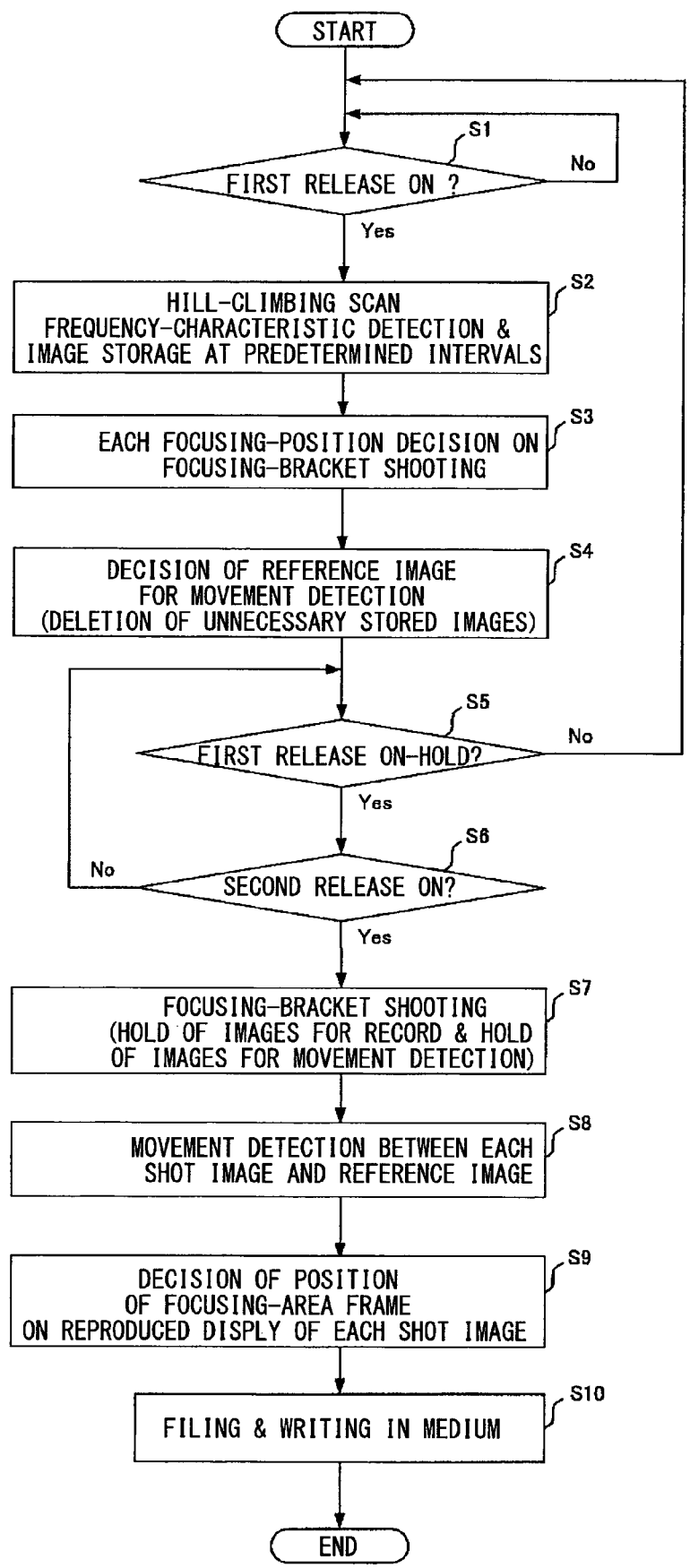
FIG. 3 is a flowchart showing an operation from ranging of a hill-climbing scan to storing of shot images by a focus-bracket shooting.

Preferred embodiments of the present invention will be explained in detail hereinafter with reference to the accompanying drawings.

FIG. 1 illustrates an embodiment in which an imaging apparatus according to the present invention is applied to a digital camera.

The digital camera 200 in the embodiment includes an optical unit 100 as a shooting optical system to form an image of a subject (not shown), a drive part 105 to drive the optical unit 100, an image processing device 110 to process the image formed by the optical unit 100, and a control device 120 to control the drive part 105, the optical unit 100 and the image processing device 110, as shown in FIG. 1. The control device 120 also acts to calculate various data from the optical unit 100, the image processing device 110 or the like.

A program memory 121 and an operation part 122 which operates the control device 120 are connected to the control device 120.

A distance-information acquiring device 111 and a display device 123 are connected to the image processing device 110. The display device 123 is configured to display images processed by the image processing device 110. The distance-information acquiring device 111 is referred to as a frequency-characteristic detection part which is described hereinafter.

A movement-detecting device 112, a recording part or image buffer memory 126, a compression-extension processing part 124 and an image recording I/F part 125 are connected through a bus line 150 to the image processing device 110 and the control device 120.

The optical unit 100 includes a lens 101, an aperture stop and shutter 102, an optical low-pass filter 103, and an image pickup device to receive an image of the subject, for example, a CMOS (complementary metal-oxide semiconductor) sensor 104 of a solid-state image sensing device.

For example, a CCD (charge-coupled device) may be used as the image pickup device, but the CMOS sensor 104 which is effective to a high readout is preferably used if the camera is used for continuous shooting.

The CMOS sensor 104 includes a sensor portion 106, a driving portion 107, a CDS (correlation double sampling)-PGA (programmable gain amplifier) 108 and an ADC (analogue-digital converter) 109.

The lens 101 of the optical unit 100 is configured to change optically and mechanically a position thereof at times of focusing, zooming, actuating and stopping. The aperture-stop and shutter 102 is configured to perform a switching operation for an opening size of an aperture stop and simultaneously an opening and closing operation for a shutter, for an exposure of a still image.

The drive part 105 performs the movement of the lens 101, the opening and closing operation of the aperture-stop and shutter 102, receiving drive instructions from the control device 120.

The CMOS sensor 104 includes light receiving elements which are arranged in a two dimension and configured to convert an optical image imaged by the lens 101 into charges. The charges are output as an electrical signal to outside with a timing of a readout signal supplied from the driving portion 107. The signal output from the CMOS sensor 104 is image-processed in a predetermined format by the image processing device 110 disposed at a back of the optical unit, and the processed image is written and stored in a recording medium such as an SD card, compact flush card (registered trade mark), XD picture card, or the like, provided in the recording part 126, through the compression-extension processing part 124 and the image recording I/F part 125.

When the digital camera is used in a state of a monitor displaying an image before the image is recorded in the recording medium, the output from the CMOS sensor 104 is processed by the image processing device 110 in a predetermined form as an image for display, and the processed image is displayed on the display device 123 by updating optionally. Meanwhile, the display device 123 is configured to perform a reproduction display and an OSD (On Screen Display) of images recorded in the recording medium.

The image processing device 110 has some functions as mentioned above. More specifically, the image processing device 110 includes a focusing-position setting part configured to be settable a plurality of reference focusing positions for the optical unit, based on the distance information, a continuous shooting part configured to change sequentially focusing positions obtained by the optical unit to the reference focusing positions set by the focusing-position setting part and acquire a plurality of image data having different focusing distance by taking a plurality times of shootings continuously, a focusing-portion deciding part configured to decide a focusing portion in a screen of the imaging data based on the distance information acquired by the distance-information acquiring device, a reference-image acquiring part configured to acquire reference image data before the plurality of shootings are continuously taken by the continuous shooting part, and a focusing-frame displaying-position deciding part configured to acquire focusing-area frame-position information representing a display position of a focusing-area frame which shows a focused area of the imaging data, every the imaging data, based on the focusing portion and the movement information. The display device 123 is configured to display overlapping the focusing-area frame on the imaging data, based on the imaging data recorded in the recording part 126 and the focusing-area frame-position information corresponding to the imaging data.

The image processing device 110 includes a correcting part configured to correct the focusing-area frame based on the detected movement information, The control device 120 is configured to control the image processing device 110 to display the corrected focusing-area frame and the imaging data together on the display device 123 when the imaging data are reproduced.

The recording part 126 is configured to record all the plurality of imaging data continuously shot by the continuous shooting part and the focusing-area frame-position information to correspond every each of the imaging data as one file.

The distance-information acquiring device includes a distance-information imaging part configured to change sequentially the focusing positions of the optical unit to predetermined focusing positions more than the plurality of focusing positions and acquire a plurality of distance-information imaging data by taking a plurality of shootings continuously at their focusing positions, and a distance-information calculation part configured to calculate the distance information of the subject based on the plurality of distance-information imaging data acquired by the distance-information imaging part.

The reference-image acquiring part is configured to acquire either of the plurality of distance-information imaging data acquired by the distance-information imaging part as the reference image data.

The imaging data shot by the continuous shooting part are larger than that of the distance-information imaging data acquired by the distance-information imaging part in data size.

The movement-detecting device 112 is configured to convert the plurality of imaging data acquired by the continuous shooting part into a size similar to that of the reference image data and output movement information corresponding thereto.

The distance-information calculation part includes an area dividing part configured to divide the screen of the imaging data into a plurality of small areas, a frequency-component extracting part configured to extract a plurality of frequency components representing a focusing state of each of the small areas of the imaging data, and a small-area distance-information calculation part configured to calculate distance information of each of the small areas based on the frequency components extracted by the frequency-component extracting part. The focusing-position setting part is configured to set a plurality of focusing positions of the optical unit based on the distance information every each of the small areas calculated by the small-area distance-information calculation part.

The distance-information calculation part includes a focusing-position distribution-information acquiring part configured to acquire focusing-position distribution-information by calculating the number of small areas focused at their focusing positions based on the distance information every the small areas, calculated by the small-area distance-information calculation part. The focusing-position setting part is configured to set a plurality of focusing positions of the optical unit based on the focusing-position distribution-information.

The imaging apparatus 200 further comprises a shooting-command receiving part configured to receive a shooting command, The continuous shooting part is configure to perform a plurality of shootings continuously based on the shooting command received by the shooting-command receiving part.

The imaging apparatus 200 further comprises a focusing-command receiving part configured to receive a focusing command. The continuous shooting part is configured to perform a plurality of shootings continuously based on the focusing command received by the focusing-command receiving part.

The distance-information acquiring device 111 is configured to acquire distance information formed in the frequency-component extracting part by a frequency detection of a hill-climbing scan, from the frequency-component extracting part disposed in a back of the optical unit. The distance-information acquiring device 111 is configure to acquire a plurality of reference image candidates with predetermined scan intervals and to store them, and decide reference images of the reference image candidates based on decided results of focusing positions for performing continuous shootings after completing a process of the hill-climbing scan.

The image processing device 110 is configured to process image data while storing the image data in the recording part 126. The acquisition of the frequency characteristic (corresponding to a predetermined frequency component representing a focusing state in a space in a scan line) of the subject by the hill-climbing scan is performed in the distance-information acquiring device or the frequency-characteristic detection part 111.

Meanwhile, the distance-information acquiring device 111 is configured to acquire distance information by dividing the screen into small areas, detecting them with small area unit, and measuring a plurality of areas, as shown in FIG. 2B which will be mentioned hereinafter.

Meanwhile, the distance-information acquiring device to acquire the distance information by measuring a distance (ranging) may be structured by a ranging radar configured to acquire distance information of the subject. The calculation of focusing positions from the frequency characteristic or final decision of a plurality of focusing positions from the calculated results is performed by the control device 120.

The movement-detecting device 112 is configured to detect a movement amount between two images supplied from the CMOS sensor 104 and output it. A detailed description of the movement-detecting device 112 is omitted, because it is usual. However, generally speaking, the movement-detecting device 112 can determine a direction of movement by quantifying concave and convex profiles of images and calculating an extreme value of a difference between two images while deviating x and y coordinates.

Although it is possible to acquire a movement amount in each block unit by dividing a screen into areas of matrix-like n×m, it is only necessary to acquire one movement amount in the entire screen because solving variation in field angle in one direction in a shooting by a handheld camera in the embodiment is intended.

The operation part 122 includes a two-step pressed release button configured to recognize and detect a state becoming OFF when releasing the release button in a half-pressed state (first release ON) where the release button is half pressed and a state becoming OFF when releasing the release button in a full-pressed state (second release ON) where the release button is fully pressed.

FIG. 2A to FIG. 2D are explanatory views for explaining a plurality of focusing positions in a focus-bracket shooting in the embodiment, FIG. 2A subjects, FIG. 2B detection frames, FIG. 2C a state in which the subjects and the detection frames are overlapped, and FIG. 2D a focusing-position distribution of each detection frame.

The subjects shown in FIG. 2A include two persons which have different distances and high-rise buildings which have infinite distances. In the focus-bracket shooting in the embodiment, it is assumed that the two persons and the high-rise buildings are important subjects. These subjects are shot at their focusing positions. At this time, the subjects and a focusing-area frame in which the focal positions of the subjects are aligned are displayed on a reproduced screen.

The frequency-characteristic detection part 111 as shown in FIG. 1 is structured in a form of detection frames. Each of the detection frames comprise one hundred and forty four (144) small areas formed by dividing a matrix-like shape of a field angle into twelve (12), as shown in FIG. 2B.

The number of division is not limited in particular, but preferably set to 5×5=25 more for the purpose of shooting.

FIG. 2C illustrates a state in which the subjects shown in FIG. 2A and the detection frames shown in FIG. 2B are overlapped. Focusing positions to the subjects in a state of small area units are calculated, and a function G (x) of a focusing-position distribution is formed by distributing the calculated focusing positions.

Values, x0 to x15 plotted on a horizontal axis of a graph shown in FIG. 2D show focusing positions obtained by a hill-climbing scan and a vertical axis of the graph shows the number of small areas focused at their focusing positions.

A function F (x) is a predetermined threshold function, the focusing-position distribution function G (x) is adapted to set positions at which the number (G (x)) of focused small areas larger than that of the threshold function F (x) as focusing positions in the focus-bracket shooting from scanned results and select the focusing positions from ones set.

However, selecting the focusing positions is not necessary because it is an algorithm to simplify a description of the embodiment according to the present invention. It should be noted that deviation of focusing positions in the focus-bracket shooting can intentionally be made. The threshold function, F (x) shown in FIG. 2D has a characteristic in which two linear functions are combined as an example, as shown in the following formula.

$$F(x)=f(x)+a \quad \text{(Formula 1)}$$

In the formula, it is possible to be capable of changing a threshold value up and down by varying the constant term (a), thereby any focusing positions can be selected. The threshold function F (x) is an increasing function toward an infinity side, in other words, set to have a small value on a near distance. This is for the reason that a subject positioning a near distance is shot preferentially. Meanwhile, in FIG. 2D, a focus-bracket shooting is executed at five (5) points, x 4, x 5, x 6, x 11, and x 15, as an example.

FIG. 3 is a flowchart showing a process including steps of performing a ranging by a hill-climbing scan, taking a focus-bracket shooting and storing shot images.

First of all, a first release is turned on, that is to say, a half-pressed state of the two-step pressed release button is confirmed (S1), if the half-pressed state is detected (Yes in S1), then a hill-climbing scan is executed (S2). At this time, in the frequency-characteristic detection part 111, frequency data at each scan position every the small areas dividing a screen are acquired. On the other hand, if the two-step pressed release button is not in the half-pressed state at the initiation step (No in S1), a user waits that the two-step pressed release button is in the half-pressed state in step S1.

All scanned images or images every predetermined scan intervals are acquired and stored in the recording part or image buffer memory 126 as reference-image candidates for movement detection, simultaneously with the acquisition of the frequency data at each scan position. Meanwhile, a capacity of the memory is reduced to a minimum resolution by a resize-process for consideration that a memory area is not occupied. As the capacity, a VGA size of about (vertical 480 pixels×horizontal 640 pixels) may be set because a movement amount of images on the entire screen is to be calculated in one direction, in the embodiment.

Next, a plurality of focusing positions is decided from the results of the hill-climbing scan (S3). About an algorithm executing the decision, various systems are considered. As one example, the five focusing positions x 4, x 5, x 6, x 11, and x 15, as shown in FIGS. 2A to 2D may be decided. Subsequently, a reference image (or images) for movement detection which corresponds to a movement between the reference image and the shot image is decided from the results of the focusing positions (S4). There is a problem in the movement detection, that if compared images have significantly different focal positions, there is generated a large difference between defocused amounts of images and hence the detection has a low accuracy. Therefore, the reference image is preferably set to an intermediate position between a near side end and a far side end of the focusing position decided in step S3.

Meanwhile, if the reference image is decided, the reference-image candidate(s) stored at the time of the hill-climbing scan is deleted from the recording part 126 in a state leaving the decided images. More specifically, about the decision (S4) of the reference image, the focusing position x 9 which is a central position between the near side end x 4 and the far side end x 15, as shown in FIG. 2D may be used.

Incidentally, the focusing position x 5 is used for the reference image, if it is considered that a subject positioning at a near side is more important than a subject positioning at a far side when considering accuracy of variation between the focused position at the time of reproduction and the display frame, because it is often considered that a subject positioning at a near position is important in a shooting in a digital camera. Meanwhile, after this process, the ON state of the first release, in other words, the continuation of a shooting is confirmed again (S5). If the first release is not in ON state (No in S5), the process is returned to the initiation step. If the first release is in ON state (Yes in S5), the process is moved from the step 5 to the next step S6 confirming the full-pressed state of the two-step pressed release button.

The process including the steps S1 to S5 is used for the decision of the reference image before shooting. Next, the full-pressed state of the two-step pressed release button (second release) is confirmed (S6). If the full-pressed state is confirmed (Yes in S6), the focus-bracket shooting is executed depending on the decision made in step S3 (S7). At this time, it is noted that image data for recording and images for movement detection, which are reduced in a size similar to the reference image are prepared in the recording part 126 by the number of focus-bracket shootings.

Next, the movement detection is executed by the reference image decided before shooting and each of the reduced images shot by the focus-bracket shooting (S8). A movement amount between two screens of the reference images and each reduced image is output by inputting the reference image and each of the reduced images in the movement-detecting device 112. Therefore, if the number of the focus-bracket shootings is 5, the same five controls are repeated. Consequently, from this result, it is possible to know how much deviation of field angle of the recorded images shot by the focus-bracket shooting occurs from the reference image.

Figure 4A:
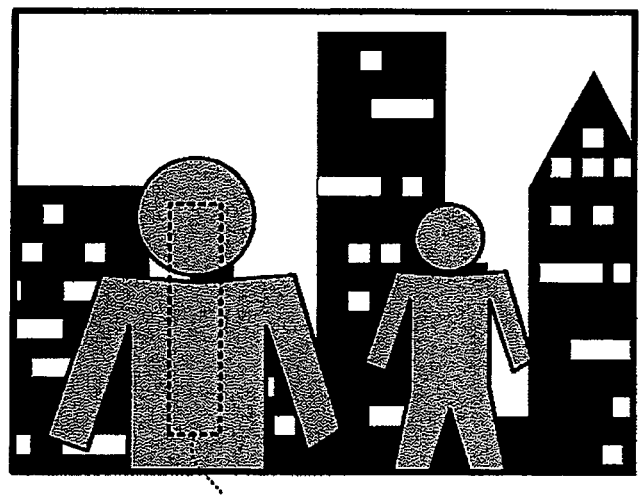
FIG. 4A is a view showing deviation of a field angle of a front person of shot image.
Figure 4B:
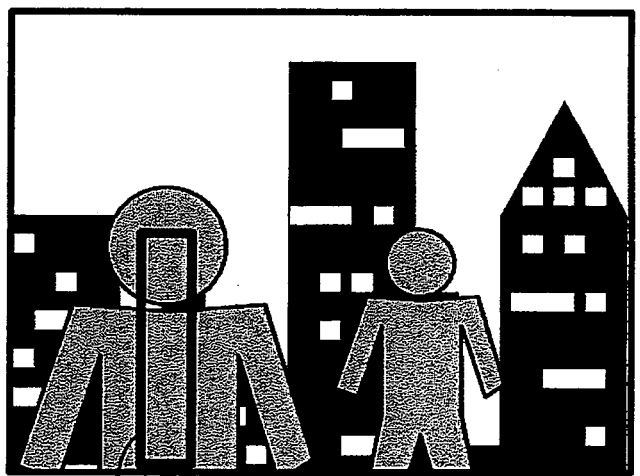
FIG. 4B is a view showing a corrected focus-area frame.

Next, a coordinate of a focusing-area frame for correcting the deviated amount and representing this correction is decided when the images are reproduced (S9). A concept of the correction is shown in FIGS. 4A and 4B. As shown in FIG. 4A, it is determined that a frame 300 shown by a broken line on a front person is a focusing-area frame at the time of the hill-climbing scan. The frame 300 shown by the broken line corresponds to six frames of the detection frames (6, 4) to (11, 4) shown in FIG. 2B, and corresponds to the focusing position x 5 as shown in FIG. 2D.

After the focusing positions are decided, five focus-bracket shootings are taken. At this time, it is considered that a field angle is recorded in a state deviated in an upper right direction from hand-shake by a time-lag reaching to the full-pressure of the release button. The field angle shot as shown in FIG. 4B becomes equivalent to a case where the entire screen is moved in a lower left direction relatively. It is necessary that a display of the focusing-area frame at the time of the reproduction is also moved in the lower left direction. A frame 400 shown by a solid line as shown in FIG. 4B is displayed as a corrected focusing-area frame which is deviated in the lower left direction based on the result acquired by the movement-detecting device 112. In this way, even though a subject and a camera deviate relatively for the reason that there is a time-lag between the time of the hill-climbing scan acquiring information of the focusing areas and the time of shooting actually, the focusing-area frame can be displayed properly onto the focusing position of each of the shot images.

Figure 5A:
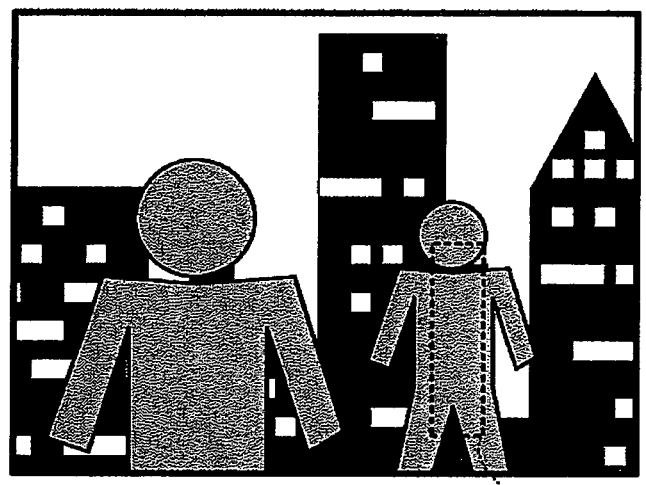
FIG. 5A is a view showing deviation of a field angle of a rear person of shot image.
Figure 5B:
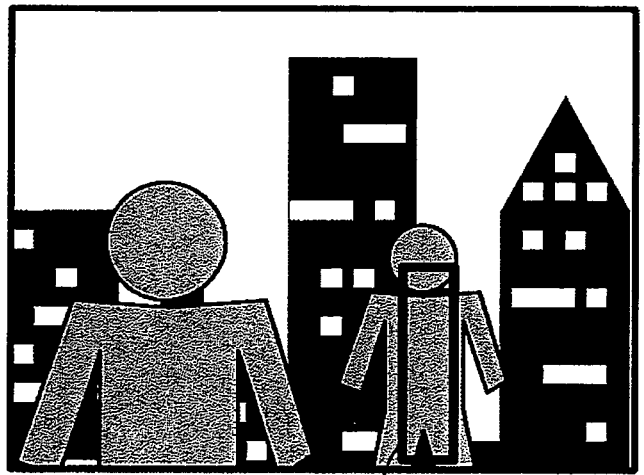
FIG. 5B is a view showing a corrected focus-area frame.

FIGS. 5A and 5B illustrate a focusing-area frame 500 which is disposed on a rear person and displayed on a different position from the focusing position x 5. It is determined in the hill-climbing scan that an area shown by a broken line onto the rear person is a focusing position or area. The frame 500 shown by the broken line corresponds to five frames of the detection frames (7, 9) to (11, 9) shown in FIG. 2B and the focusing position x 11 shown in FIG. 2D. Then, the focusing-area frame 500 is corrected as a corrected focusing-area frame 600 as shown in FIG. 5B based on the result of the movement-detecting device 112, similarly to the case shown in FIGS. 4A and 4B.

Finally, the information such as the corrected focusing-area frame and so on, acquired as mentioned above is stored in a recording medium or the like provided in the recording part 126 (S10). In this case, a filing is prepared by attaching the coordinate information representing the focusing-area frame, which is decided in the step S9 to the recorded image data. As the filing in the step S10, the plurality of image data shot by the focus-bracket shooting are stored as a multi-page file, in the embodiment. The multi-page file is prepared in the recording part 126. The multi-page file is explained in detail hereinafter.

Figure 6:
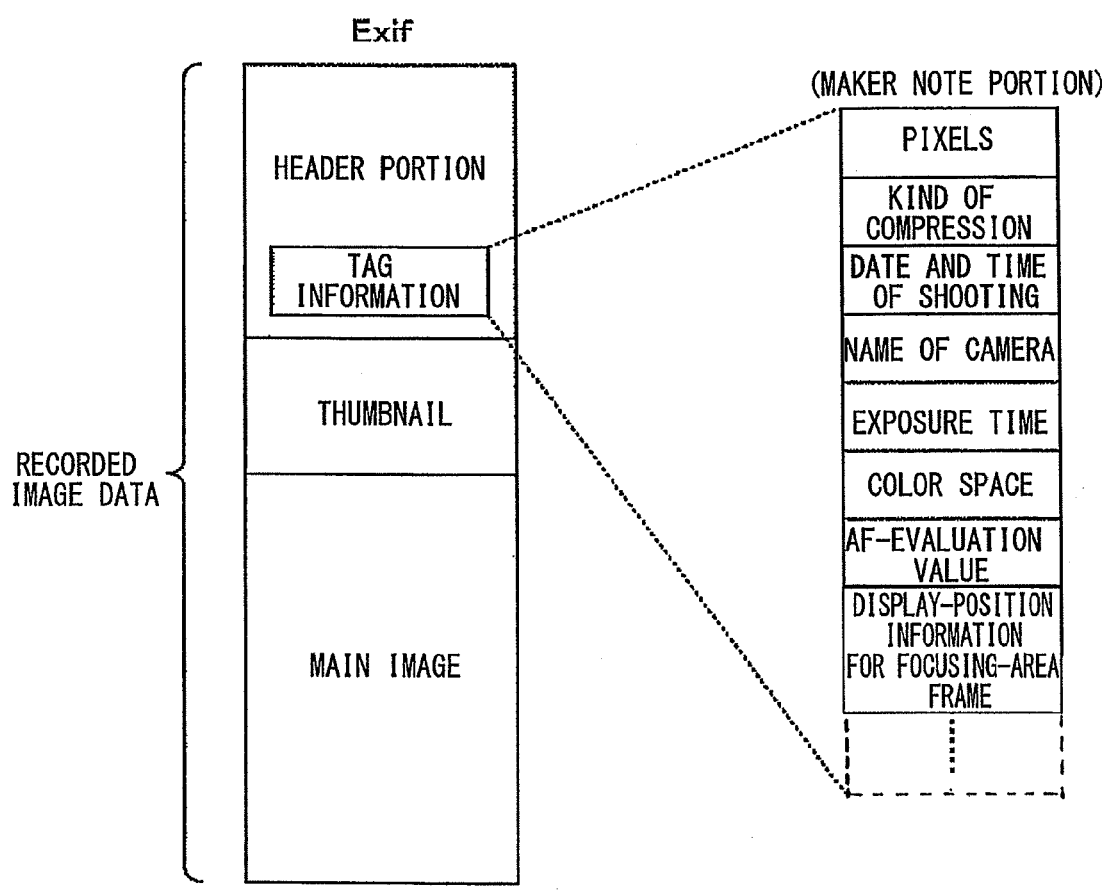
FIG. 6 is an explanatory view for explaining tag information of a header portion of an Exif.

The plurality (n) of recorded images shot by changing focusing positions continuously, with the focus-bracket shooting are stored as one multi-page file formed by corresponding the recorded images to the information of the movement amount between the reference image decided before shooting and each of the recorded images. For example, if the recorded images are recorded in Exif (Exchangeable Image File Format) standardized by JEIDA (Japanese electronic industrial development association), as shown in FIG. 6, the recorded images are written in tag information of a header part of Exif together with information such as a kind of a camera, date and time of shooting, a value of aperture, a shutter speed, a displayed position of the focusing-area frame and so on and stored in the Exif as recorded image data of the multi-page file.

Figure 7:
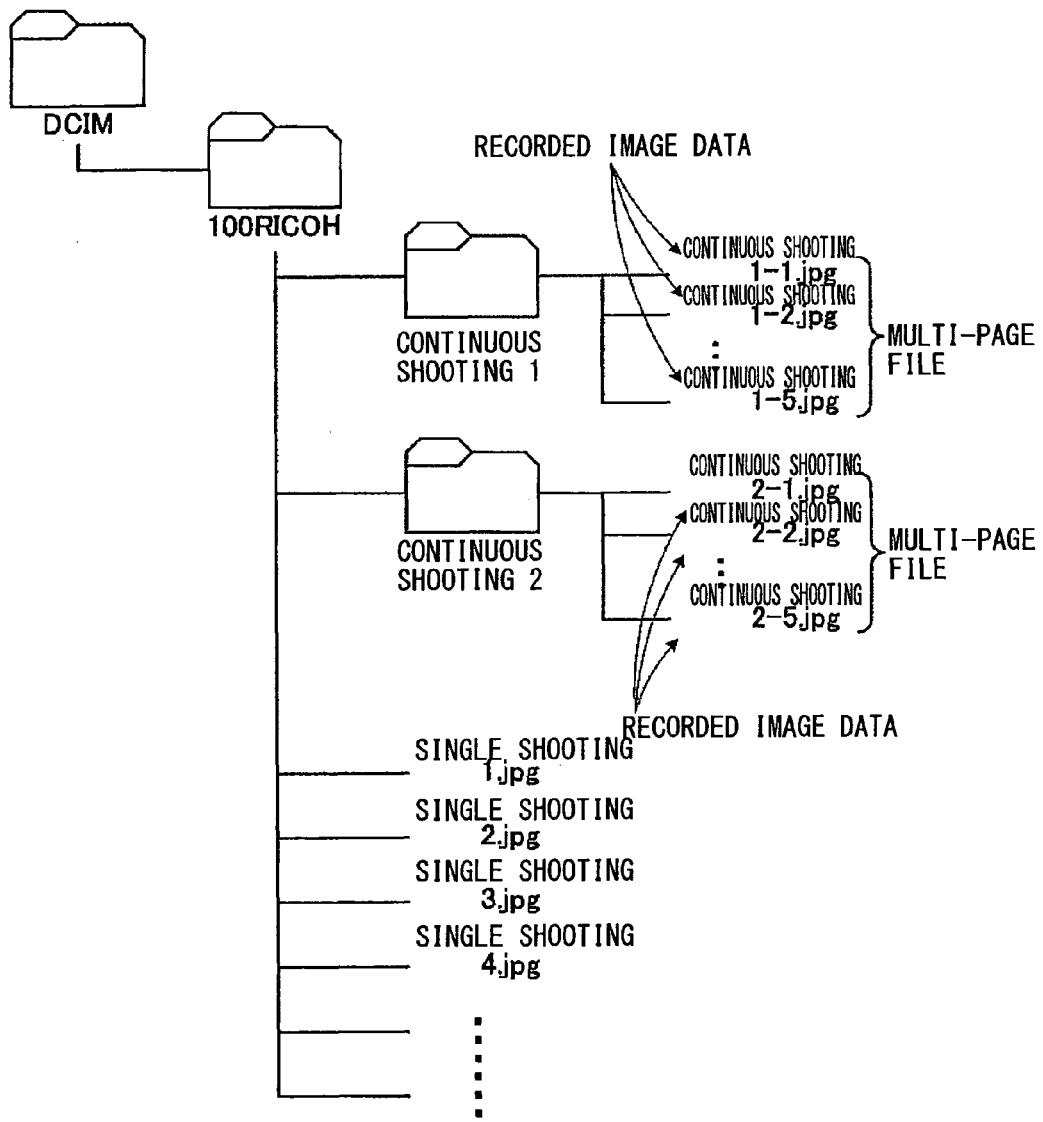
FIG. 7 is an explanatory view for explaining a file tree structure having a directory definition of DCF and a multi-page file.

N (number) recorded image data are defined as a directory of a DCF (camera system standard) as shown in FIG. 7 and n-recorded image data shot by the focus-bracket shooting are stored in one holder (continuous shooting 1 holder) together as a multi-page file, thereby a multi-page file, five multi-page files in the embodiment are prepared. Meanwhile, the multi-page file is stored in the recording medium such as the SD card or the like in the recording part 126, through the image recording I/F part 125 as shown in FIG. 1. The recorded images are extracted depending on information stored in the Exif.

Figure 8:
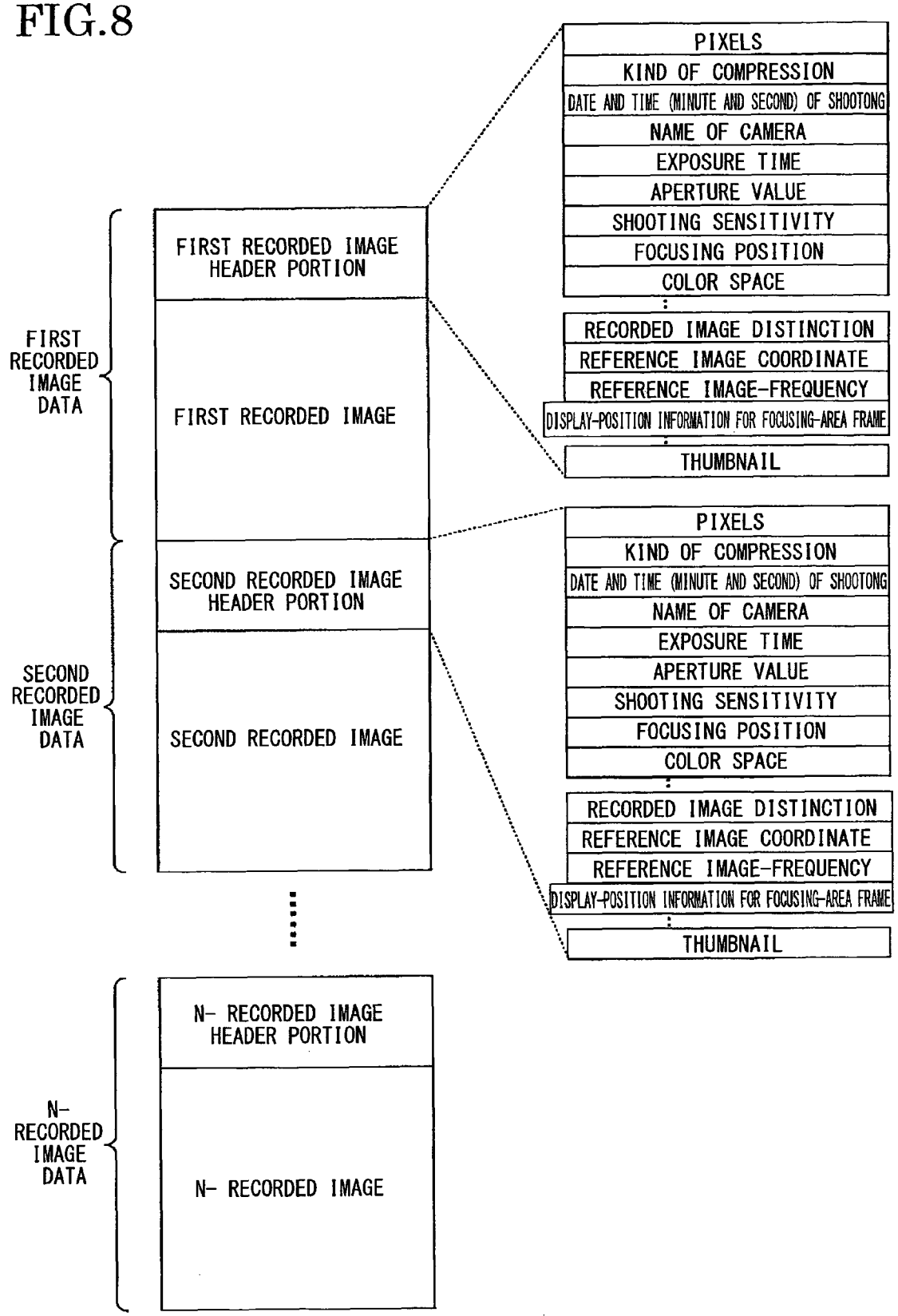
FIG. 8 is an explanatory view for explaining another multi-page file.

Another example of the storage of the multi-page file is explained with reference to FIG. 8. A multi-page file shown in FIG. 8 differs from the multi-page file shown in FIG. 7 in that n recorded images shot by the focus-bracket shooting are combined. In the multi-page file, the recorded image data for each multi-page file comprise recorded image-header portions and recorded image portions and are combined in order of shooting. Shooting condition data of the recorded images, which are recorded image data of shooting such as pixel numbers, type of compression, date and time (including minute and second) of shooting, name of imaging apparatus for shooting the recorded images, exposure time, aperture value, sensitivity of shooting, focusing position, color space, and so on are included in each of the recorded-image header portions. In addition, a flag for discriminating the recorded images, coordinate information relating to the reference image, information of frequency characteristic of detection frames, focusing positions, focusing-area frames, position information of the focusing-area frames, thumb nails of the recorded images and so on are included in each of the recorded image-header portions.

As mentioned above, the present invention makes it possible to provide a convenient imaging apparatus or digital camera capable of taking a focus-bracket shooting, avoiding a positional deviation of the focus-area frame displayed together with the shot images in reproduction of the shot images, accomplishing easy control by storing the shot images continuously shot by the focus-bracket shooting as a multi-page file, accomplishing easy treatment of image selection or the like desired by a user, moving a focus range wider than that of a conventional focus-bracket shooting, and adding the shot images to information of the focusing positions of a subject.

In the aforementioned embodiment, although the focus-bracket shooting is configured to take five images, if the focus-bracket shooting is configured to take about five to ten images in consideration of recent digital technology, it is possible to provide a convenient digital camera capable of responding to a request from a market and having less influence to usability due to a cost up of instruments and an increment of shooting time or recording-process time with an increment of buffer memory capacity.

Here, one example of the image display apparatus according to the present invention is explained. The image display apparatus in the example includes the display device 123 configured to display the recorded images or imaging data stored in recording medium provided in the recording part 126 of the aforementioned imaging apparatus. In other words, the imaging apparatus has a monitor function executed by the image display apparatus. Consequently, an exclusive reproduction device for displaying images is not needed. By using the function, the focusing-area frame is displayed to be overlapped on the imaging data, based on the imaging data and the position information of the focusing-area frames corresponding to the imaging data. The image display apparatus includes a file-reading part configured to read a file recorded in the recording medium and the display device configured to display imaging data in the file read in the file-reading part. The file of the image data displayed on the display device includes a plurality of imaging data having different focusing distances, acquired by taking a plurality of continuous shootings and position information of focusing-area frames which is corresponded to the imaging data every each imaging datum and shows a display position to display a focusing-area frame representing a focusing portion of the imaging data.

In the display device, when one imaging datum is selected from the plurality of imaging data having different focusing distances, the selected one datum can be displayed on the display device in a state where the focusing-area frame based on focusing-area frame-position information corresponding to the one imaging datum is overlapped on the one imaging datum. Thereby, it is possible to select easily a focused image desired by a user, of the imaging data.

Meanwhile, the imaging data can be displayed on the display device to be switchable a continuous display mode for displaying the plurality of imaging data continuously and a tabulated mode or thumbnail display for displaying the plurality of imaging data together.

Next, one embodiment of the method of correcting a position of the focusing-area frame, according to the present invention is explained.

The method of correcting a focusing-area frame comprises preparing an optical unit of forming images from a subject, acquiring distance information to the subject, detecting a movement amount between the images formed by the optical unit, forming a focusing-area frame for the images based on the distance information, displaying the images output from the optical unit and the focusing-area frame when reproducing the images, acquiring a reference image before shooting, and correcting the focusing-area frame by changing a displayed position of the focusing-area frame based on detected results of movement amount detected between the reference image and each of the images.

In the imaging apparatus and the method of correcting a position of a focusing-area frame, according to the present invention, a reference image before shooting is acquired, a movement-detection between the reference images and an image of images shot by a focus-bracket shooting is executed, a position of a focus-area frame is corrected based on the result of the movement-detection to correct deviation or variation of a field angle of the image, and the corrected focusing-area frame is displayed on the image, thereby a user can select a focused image easily.

Although the preferred embodiments of the present invention have been described, it should be appreciated that the present invention is not limited thereto, various modifications and changes can be made to these embodiments.

The invention claimed is:

1. An imaging apparatus, comprising:
an optical unit capable of changing a focusing position and converting an image of a subject into an electric signal;
an image processing device configured to acquire a plurality of image data for a corresponding plurality of shot images having different focusing distances, by taking multiple shootings continuously, and wherein the image processing device is configured to convert the electric signal from the optical unit into imaging data and acquire and decide on reference image data before the multiple shootings are taken, and wherein the reference image data is reference data common to the image data for the plurality of shot images;
a display device configured to display the imaging data;
a control device configured to control the image processing device; and
a movement-detecting device connected to the image processing device and the control device and configured to detect movement information representing a variation between the image data for the plurality of shot images and the acquired reference image data, for each of the shot images,
the image processing device including a correcting part configured to correct a focusing-area frame representing a focusing position of the image data for the shot images, based on the detected movement information,
the control device being configured to control the image processing device to display the corrected focusing-area frame and the image data for the shot images together on the display device when the image data for the shot images are reproduced.

2. The imaging apparatus according to claim 1, further comprising a recording part connected to the image processing device and configured to record the imaging data, and a distance-information acquiring device connected to the image processing device and configured to acquire distance information of the subject, the display device being configured to display the imaging data recorded in the recording device, the image processing device including a focusing-position setting part configured to be settable a plurality of reference focusing positions for the optical unit, based on the distance information, a continuous shooting part configured to change sequentially focusing positions obtained by the optical unit to the reference focusing positions set by the focusing-position setting part, a focusing-portion deciding part configured to decide a focusing portion in a screen of the imaging data based on the distance information acquired by the distance-information acquiring device, and a focusing-frame displaying-position deciding part configured to acquire focusing-area frame-position information representing a display position of a focusing-area frame which shows a focused area of the imaging data, based on the focusing portion and the movement information.

3. The imaging apparatus according to claim 1, further comprising a recording part connected to the image processing device and configured to record the imaging data, and a distance-information acquiring device connected to the image processing device and configured to acquire distance information of the subject, the display device being configured to display the imaging data recorded in the recording device, the image processing device including a focusing-position setting part configured to be settable a plurality of reference focusing positions for the optical unit, based on the distance information, a continuous shooting part configured to change sequentially focusing positions obtained by the optical unit to the reference focusing positions set by the focusing-position setting part, a focusing-portion deciding part configured to decide a focusing portion in a screen of the imaging data based on the distance information acquired by the distance-information acquiring device, and a focusing-frame displaying-position deciding part configured to acquire focusing-area frame-position information representing a display position of a focusing-area frame which shows a focused area of the imaging data, based on the focusing portion and the movement information, the recording part being configured to record all the plurality of imaging data continuously shot by the continuous shooting part and the focusing-area frame-position information for each of the imaging data as one file.

4. The imaging apparatus according to claim 2, wherein the distance-information acquiring device includes a distance-information imaging part configured to change sequentially the focusing positions of the optical unit to predetermined focusing positions more than the plurality of focusing positions and acquire a plurality of distance-information imaging data by taking a plurality of shootings continuously at their focusing positions, and a distance-information calculation part configured to calculate the distance information of the subject based on the plurality of distance-information imaging data acquired by the distance-information imaging part.

5. The imaging apparatus according to claim 4, wherein the reference-image acquiring part is configured to acquire either of the plurality of distance-information imaging data acquired by the distance-information imaging part as the reference image data.

6. The imaging apparatus according to claim 4, wherein the imaging data shot by the continuous shooting part are larger than that of the distance-information imaging data acquired by the distance-information imaging part in data size.

7. The imaging apparatus according to claim 4, wherein the distance-information calculation part includes an area dividing part configured to divide the screen of the imaging data into a plurality of small areas, a frequency-component extracting part configured to extract a plurality of frequency components representing a focusing state of each of the small areas of the imaging data, and a small-area distance-information calculation part configured to calculate distance information of each of the small areas based on the frequency components extracted by the frequency-component extracting part, wherein the focusing-position setting part is configured to set a plurality of focusing positions of the optical unit based on the distance information every each of the small areas calculated by the small-area distance-information calculation part.

8. The imaging apparatus according to claim 4, wherein the distance-information calculation part includes a focusing-position distribution-information acquiring part configured to acquire focusing-position distribution-information by calculating the number of small areas focused at their focusing positions based on the distance information every the small areas, calculated by the small-area distance-information calculation part, wherein the focusing-position setting part is configured to set a plurality of focusing positions of the optical unit based on the focusing-position distribution-information.

9. The imaging apparatus according to claim 1, further comprising a shooting-command receiving part configured to receive a shooting command, wherein the multiple shootings are performed based on the shooting command received by the shooting-command receiving part.

10. The imaging apparatus according to claim 1, further comprising a focusing-command receiving part configured to receive a focusing command, wherein the multiple shootings are performed based on the focusing command received by the focusing-command receiving part.

11. The imaging apparatus according to claim 2, wherein the distance-information acquiring device is configured to acquire distance information formed in a frequency-component extracting part by a frequency detection of a hill-climbing scan, wherein the frequency-component extracting part is disposed in a back of the optical unit, and wherein the distance-information acquiring device is configured to acquire and record a plurality of reference image candidates by predetermined scan intervals, and decide reference images of the reference image candidates based on decided results of focusing positions for performing continuous shootings after completing a process of the hill-climbing scan.

12. An image display apparatus configured to display image data, said image display apparatus comprising the imaging apparatus as recited in claim 1.

13. An imaging apparatus, comprising:
an optical unit capable of changing a focusing position and converting an image of a subject into an electric signal;
an image processing device configured to convert the electric signal from the optical unit into imaging data and acquire reference image data before a shooting is taken;
a display device configured to display the imaging data;
a control device configured to control the image processing device; and
a movement-detecting device connected to the image processing device and the control device and configured to detect movement information representing a variation between the imaging data and the reference image data, about each of the imaging data,
the image processing device including a correcting part configured to correct a focusing-area frame representing a focusing position of the imaging data, based on the detected movement information,
the control device being configured to control the image processing device to display the corrected focusing-area frame and the imaging data together on the display device when the imaging data are reproduced; and
wherein the imaging apparatus further comprises a recording part connected to the image processing device and configured to record the imaging data, and a distance-information acquiring device connected to the image processing device and configured to acquire distance information of the subject, the display device being configured to display the imaging data recorded in the recording device, the image processing device including a focusing-position setting part configured to be settable a plurality of reference focusing positions for the optical unit, based on the distance information, a continuous shooting part configured to change sequentially focusing positions obtained by the optical unit to the reference focusing positions set by the focusing-position setting part and acquire a plurality of image data having different focusing distance by taking a plurality times of shootings continuously, a focusing-portion deciding part configured to decide a focusing portion in a screen of the imaging data based on the distance information acquired by the distance-information acquiring device, a reference-image acquiring part configured to acquire reference image data before the plurality of shootings are continuously taken by the continuous shooting part, and a focusing-frame displaying-position deciding part configured to acquire focusing-area frame-position information representing a display position of a focusing-area frame which shows a focused area of the imaging data, every the imaging data, based on the focusing portion and the movement information, the display device being configured to display overlapping the focusing-area frame on the imaging data, based on the imaging data recorded in the recording part and the focusing-area frame-position information corresponding to the imaging data; and
wherein the movement-detecting device is configured to convert the plurality of imaging data acquired by the continuous shooting part into a size similar to that of the reference image data and output movement information corresponding thereto.

14. An imaging method, comprising:
preparing an optical unit capable of changing a focusing position and converting an image of a subject into an electric signal;
preparing an image processing device configured to acquire a plurality of image data for a corresponding plurality of shot images having different focusing distances, by taking multiple shootings continuously, and wherein the image processing device is configured to convert the electric signal from the optical unit into imaging data and acquire and decide on reference image data before the multiple shootings are taken, and wherein the reference image data is reference data common to the image data for the plurality of shot images;
preparing a display device configured to display the imaging data;
preparing a movement-detecting device connected to the image processing device and the control device and configured to detect movement information representing a variation between the image data for the shot images and the acquired reference image data, for each of the shot images;
correcting a focusing-area frame representing a focusing position of the image data for the shot images, based on the detected movement information; and
controlling the image processing device to display the corrected focusing-area frame and the image data for the shot images together on the display device when the image data for the shot images are reproduced.

15. A method of correcting a focusing-area frame, comprising:
- providing an optical unit for forming images from a subject;
- acquiring distance information to the subject;
- detecting a movement amount between the images formed by the optical unit;
- forming a focusing-area frame for the images based on the distance information;
- displaying the images output from the optical unit and the focusing-area frame when reproducing the images;
- acquiring a reference image; and
- correcting the focusing-area frame by changing a displayed position of the focusing-area frame based on detected results of movement amount detected between the reference image and each of the images, and wherein the images are formed by taking multiple shootings continuously, and wherein the reference image is determined before the multiple shootings are taken.

* * * * *